Aug. 18, 1959 J. T. BECK 2,900,580

PRINTED ELECTRICAL CIRCUIT COMPONENTS HAVING INTEGRAL LEAD-OUTS AND METHODS OF MAKING SAME

Filed June 4, 1954 2 Sheets-Sheet 1

INVENTOR.
JOHN T. BECK
BY Paul, Moore & Hugger
ATTORNEYS

INVENTOR.
JOHN T. BECK
BY Paul, Moore & Hugger
ATTORNEYS

United States Patent Office 2,900,580

Patented Aug. 18, 1959

2,900,580

PRINTED ELECTRICAL CIRCUIT COMPONENTS HAVING INTEGRAL LEAD-OUTS AND METHODS OF MAKING SAME

John T. Beck, White Bear Lake, Minn., assignor to Beck's, Inc., St. Paul, Minn., a corporation of Minnesota Application June 4, 1954, Serial No. 434,401

7 Claims. (Cl. 317—101)

This invention relates to electrical circuit components and methods of making the same. More particularly this invention relates to so-called "printed" circuit components which have integrally formed conducting lead-out elements and to methods of making such components.

There have recently been developed so-called "printed" electrical circuits in which some or all of the components are composed of members that are "printed" on an insulating base either by adaptations of conventional printing methods, by stenciling, by spray-milling techniques or the like. Circuits of this type offer advantages in that they are compact, light weight, easily duplicated and more economical than corresponding manually assembled circuits. However, in the past such circuit elements tended to be comparatively fragile and were not of high conductivity, as compared with electrically conductive metals per se, and the circuits did not readily adapt themselves to the attachment of external leads by soldering and the like because the circuit elements are thin and tend to "lift" when soldered.

For economic reasons, in the mass production of circuits, all of the individual circuit elements and the "printed" circuit component are first assembled and all of the connections involved are soldered in one operation by dipping. Obviously, this is impractical if the printed-on circuit components will peel or dislodge from the underlying insulating surface, as frequently occurs in circuits made by prior methods.

Ordinary printed circuits were sensitive to the effects of humidity and weathering. Because the printed-on components are very thin they were unsatisfactory for switch or commutator contacts, where a wiping action is encountered.

In my co-pending applications, Serial No. 138,245, now Patent 2,734,150, for Circuit Component and Method of Making Same; Serial No. 138,246, now Patent 2,683,839, for Electrical Circuit Components and Method of Preparing Same; and Serial No. 138,247, now Patent 2,695,351, for Electric Circuit Components and Methods of Preparing the Same, all filed on January 12, 1950, there are disclosed methods of making "printed" circuit components which obviate the above enumerated disadvantages. In these components electrical contact is usually made by soldering a connector directly to the circuit element or by drilling a hole through the element and the insulating base and soldering the connector in this hole. For many circuit components, however, it is desirable or necessary that interior circuit elements be provided with outside terminal connections which are at the same time integral with the circuit element, insulated from other circuit elements and do not add to the bulk of the circuit component.

It is the principal object of this invention, therefore, to provide improved electrical circuit components having such integral terminals.

It is another object of this invention to provide a simple, economical method by which improved circuit components having integral lead-outs may be produced.

A further object of this invention is to provide an improved electrical circuit component possessing the high conductivity of electrically conductive metals and having external terminals integral with the interior circuit elements and insulated from other circuit elements but without sacrificing light weight and compactness of the circuit.

A still further object of this invention is to provide a method of making improved circuit components in which a portion of an interior circuit element is freed from the supporting insulating base and passed to the exterior of the component to provide an external terminal.

Other objects of this invention will become apparent as the description proceeds.

To the accomplishment of the foregoing and related ends, this invention then comprising the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which corresponding numerals refer to the same parts and in which.

Figure 1:
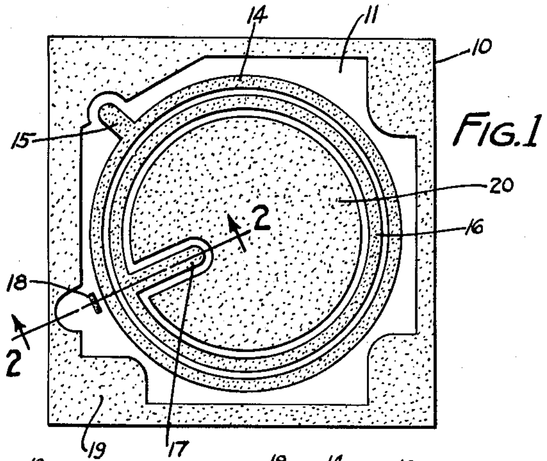
Figure 1 is a top plan view of a plate of resinous insulating material with a sheet of electrically conductive metal adhesively secured to the top surface thereof having a resist coating applied to the metal in the configuration of a slip ring commutator.
Figure 2:
Figure 2 through 6 are enlarged detailed vertical sectional views taken along the line 2—2 and in the direction of the arrows of Figure 1 and showing successive steps in the manufacture of a circuit component according to this invention.

Referring now to the drawings and particularly to Figures 1 and 2, there is here shown a top plan view and a vertical section of a portion of a plate of insulating material 10 having a sheet of electrically conductive metal 11 adhesively secured thereto and having a resist coating printed or stenciled on the exposed metal surface. The base plate is preferably formed of a partially hardened thermosetting resinous insulating material such as, for example, the phenolics, urea-formaldehyde resins, melamines, furans and the like. Desirably the resinous base plate may be reinforced by glass fibers or the like. For example, the base sheet may be formed by impregnating a sheet of woven "Fiberglas" fabric with a phenol-formaldehyde resin in the "A" stage and then allowing the resin impregnated sheet to partially harden. A sheet or foil of an electrically conductive metal is adhesively secured to the insulating base sheet. The metal may be copper, aluminum, silver, brass or the like. The adhesive layer 12 may be any of those resins from which the base may be formed or may be any one of a large number of additional adhesive materials. Such adhesives also include, but are not limited to, the vinyl resins, polystyrenes, silicones, acrylics, cellulosics and the like. The metal sheet 11 is preferably firmly pressed upon the adhesive layer 12 on base 10 and the whole unit is subjected to heat only sufficient to partially cure the resinous adhesive so as to hold the sheets 10 and 11 firmly together during processing.

Upon the upper surface of the metal sheet 11 there is applied a design which outlines the circuit elements which are desired to be produced on the base sheet 10. In the form illustrated in Figure 1, the resist material is shown in the shaded areas in the form of an outer ring 14 having a terminal connection 15 directed radially outward therefrom, an inner ring 16 having a tab 17 directed radially inward therefrom, an indexing mark 18 in the form of a short line lying just outside of the outer ring 14 and transverse of a radial line drawn through the center of tab 17, and other areas 19 and 20, which are not part of the finished component but which are provided with a stop-off coating for the purpose of preventing rapid depletion of the etching bath. This outline of the circuit is formed by means of a stop-off material which is capable of resisting the erosive effects of an etching bath for the metal of which the conductive layer is formed. It may be in the form of a paint or lacquer of a consistency such that it can be rubbed through a silk screen, other stencils, printed-on or otherwise applied to produce the circuit outline being manufactured. In general, any of the resinous materials useful as the adhesive layer may be used to form the stop-off coating. The stencil may conveniently be formed of a thin paramagnetic material and held in place by magnets on the back of the base.

In producing some circuits, particularly where some of the elements and connecting circuit lines are of minute size, the stop-off enamel may be placed advantageously in the same manner as for the usual photo-engraving process using light-sensitive enamels. In such a process the entire exposed metal surface of base sheet 10 is covered with a light-sensitive enamel which is then exposed through a negative which permits light to fall on the enamel only in areas corresponding to those of the circuit lines and elements. The exposure of light sets the enamel in a hard, insoluble condition. The remaining enamel is soft and is washed away in developing. The hardened enamel thus placed then protects the underlying metal during subsequent etching.

After the resist coating has been "printed" on the metal surface of the component blank and the coating has been permitted to set, the surfaces of the component are exposed to the effect of a chemical or electrolytic etching bath. The etching bath is selected appropriately, as is well known in the etching and photo-engraving arts, for the type of metal composing conductive layer 11. Thus, for example, where copper is used, the etching bath may consist of iron chloride and copper sulfate solution or acids, chlorides, or the like suitable for the removal of copper. Electrolytic etching baths for the metal or alloy composing the layer 11 are available and the techniques are well known.

Figure 3:
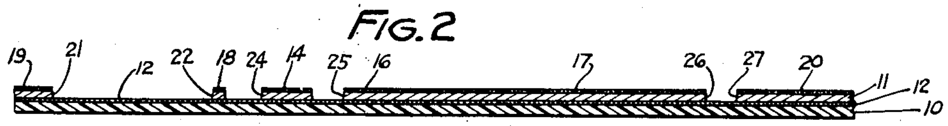

The component is permitted to remain in the etching bath until the unprotected metal has been eaten away, as shown in Figure 3, leaving a series of isolated raised areas of metal 21, 22, ring 24, ring 25 and tab 26 and area 27 all corresponding to the portions of the surface covered with resist coatings 19, 18, 14, 16 and 17 and 20, respectively, and producing a series of valleys, exposing adhesive layer 12, where the metal was unprotected. It will be noted that the raised areas have slightly outwardly concave sloping walls. This feature, which permits obtaining extremely fine circuit lines without danger of undercutting and weakening or lifting from the surface and which serves to lock the metal elements of the circuit in place in the final unit, is obtained by timing the etching and controlling the strength of the etching bath so as to produce the outward slope rather than a vertical or undercut surface. When electrolytic etching processes are used the outward sloping effect is obtained by adjusting the current (voltage) to obtain a rapid etch.

Figures 4, 5, 6, 7:
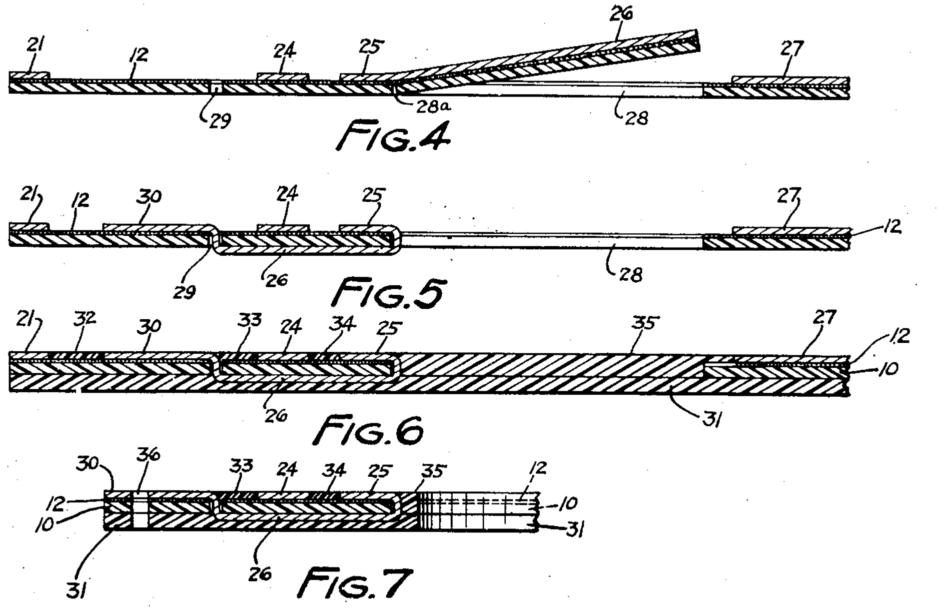
Figure 7 is an enlarged vertical section taken along line 7—7 and in the direction of the arrows of Figure 8 and showing a terminal connection of a preferred form of a finished slip ring commutator.

After the etching is completed to the desired depth the circuit component is removed from the etching bath, washed to stop the action of the etching compounds and the resist coating is preferably removed, as shown in Figure 4. Thereafter, a die cut 28 is made around tab 26 which is formed in metal sheet 11 and extends radially inwardly from ring 25. The die cut tab formed in the base layer is cut at 28A and this and metal tab 26 are lifted from the surface of base sheet 10. The resinous base tab is then removed from metal tab 26. This may be done by sliding a sharp blade under the tab or where a thermoplastic adhesive layer 12 has been used by sliding a hot blade under the end of tab 26 to free it from the base. A slot 29 is formed at 22 where index mark 18 left a thin short line of metal. The free end of tab 26 is then passed downwardly through slot 28, radially outward across the bottom of base 10, up through slot 29 and thence again radially outward to form terminal 30, as shown in Figure 5.

Thereafter, as shown in Figure 6, a further insulating layer 31 is provided over the bottom of the circuit component, the areas 32, 33, 34 and 35 between the raised metallic circuit elements are preferably filled with resinous insulating material and the whole unit is subjected to heat and pressure to set and cure the resinous materials. The added bottom layer 31 may be applied in the form of a coating or as a preformed film or sheet in the nature of original base sheet 10. The insulating material applied to the areas between the circuit elements is preferably a thermosetting resin and may be in the form of an appropriately apertured sheet, a liquid, a paste or a powder and may be applied through a stencil or by other means well known in the coating arts. Where the nature of the component permits, instead of filling the spaces between the conductive metal elements with resin, the circuit elements may be pressed into the resinous base in the manner described in my co-pending application, Serial No. 138,245. Any excess resinous material may be removed from the surface of the circuit component by gentle abrading.

Figure 8:
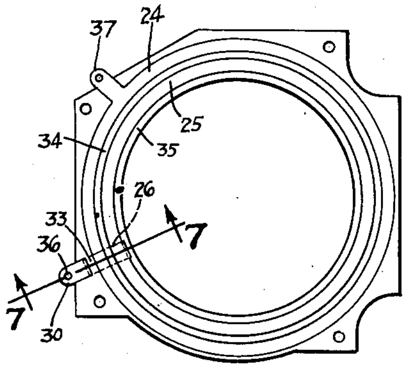
Figure 8 is a top plan view of a finished slip ring commutator.

The result as shown in Figures 7 and 8 is a finished electrical circuit component presenting a smooth surface having selected portions of the circuit elements exposed at the surface of the component and substantially surrounded by insulating resinous material substantially level and coextensive therewith. The component may be cut to form, as shown, if desired, removing the unwanted exposed metallic areas 21 and 27. Terminal 30, though external of the circuit and isolated on the surface from interior circuit element or ring 25 is integral therewith and insulated from ring 24. An integral insulated external terminal has been provided for the interior circuit element and at the same time the lightweight and compactness of the component have been preserved. A hole 36 may be provided for making a soldered connection to terminal 30. A similar hole is provided in terminal 37.

Figure 9:
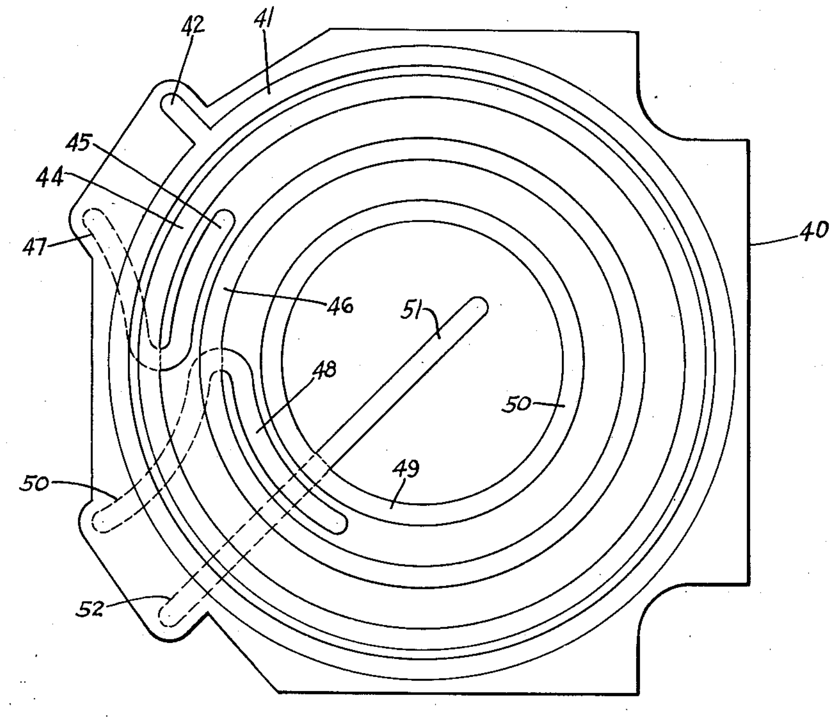
Figure 9 is a top plan view of an alternative form of circuit component embodying the features of this invention.

A modified form of circuit component having a plurality of interior circuit elements, each of which may be provided with an integral, insulated external terminal, is shown in Figure 9. Each of the circuit elements is formed of conductive sheet metal adhesively secured to a base 40 and etched in the manner described above. The outer circuit element or ring 41 is provided with a direct external terminal 42. Proceeding inwardly the next circuit element or ring 44 has formed integrally with it a generally arcuate tab 45 positioned between ring 44 and the next inner ring 46. This tab 45 when die cut and lifted free from the base plate 40 may be reversed to form an external terminal 47 according to this invention as shown by the doted lines. In the same manner ring 46 has an integral arcuate tab 48 formed between rings 46 and 49 which may be die cut, lifted and reversed to form an external terminal 50 as shown by the dotted lines. The innermost ring 50 is provided in an integral tab 51 which projects radially inwardly and when lifted and reversed as shown by the dotted lines may form an external terminal 52.

Although this invention has been illustrated and described with particular refernce to a simple circuit component and etching process, it is to be understood that the principles of this invention are not so limited but are adaptable as well for use with the processes of any of my previously identified co-pending applications (the disclosures of which are incorporated herein by reference) where it is desired to make circuit components having interior circuit elements with external terminals.

Instead of being used solely for making external terminals it will be obvious to one skilled in this art that by following the teachings of this disclosure a variety of other by-passing connections may be made. Similarly, in some instances, it may be desired that the lead-out terminal be in the opposite face of the component from the circuit element with which it is integral.

Figure 10:
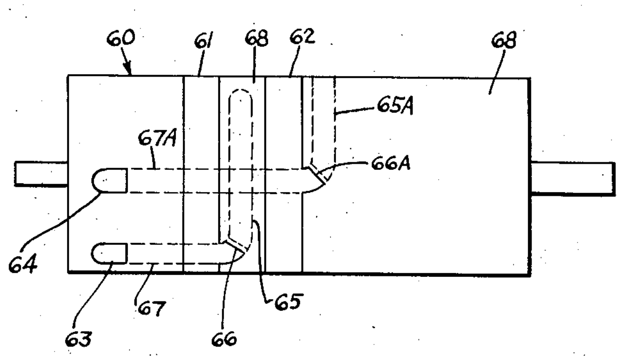
Figure 10 is an elevation of a further alternative form of circuit component.

The invention similarly is not limited to forming terminals on flat planar circuit components but may be used as well to form like lead-out for cylindrical and other non-planar components. For example, as shown in Figure 10, the component may be in the form of cylinder 60 formed from a tube of resinous insulating material overlaid with a sheet of metal foil in the manner heretofore described for planar components. Circuit components 61 and 62 are formed from this foil layer. Formed integrally with elements 61 and 62 are terminals 63 and 64. Terminal 63 is formed from the foil layer by etching at the same time as element 61 the resist layer being applied in the area 65 indicated by dotted lines. The tab formed thereby is then die cut and freed from the insulating base, folded under as indicated at 66 and then led out by the path 67 on the inner surface of the tubular base to the terminal 63. Terminal 64 is formed at the same time and in the same manner from tab 65A folded at 66A and brought out by path 67A. After the terminals are formed an insulating core in the form of a tube or cylinder is inserted in the tubular base, an insulating layer 68 is applied in the area between the circuit components on the exposed surface and the entire component is baked under uniform non-planar pressure in the manner disclosed in my co-pending application Serial No. 434,402 for Cylindrical Printed Circuit and Method of Producing Same filed of even date herewith.

As many apparently widely differing embodiments of this invention may be made without departing from the spirit and scope thereof, it is to be understood that I do not limit myself specifically to the embodiments disclosed herein.

What I claim is:

1. An electrical circuit component comprising a pair of superimposed hardened and cured thermosetting resinous layers of insulating material bonded together to form a composite sheet, thin conductive metal in the form of elongated areas forming circuit elements at the surface of said composite sheet, at least some of said circuit elements being positioned interiorly from the edges of said composite sheet, a terminal lead-out formed integrally with said interiorly positioned circuit element, said lead-out passing between said superimposed resinous layers out of contact with and beneath the more exteriorly positioned circuit elements and re-emerging exposed at the surface of said composite sheet adjacent an exterior edge thereof, the terminal portion of said lead-out being bonded to and embedded in the surface of said composite sheet.

2. An electrical component according to claim 1 further characterized in that the exposed portions of said metal circuit elements are substantially level and co-extensive with the surface of said composite sheet.

3. A method of making electrical circuit components which comprises the steps of attaching a sheet of conductive metal to a base layer of uncured resinous insulating material, outlining separated circuit elements on the exposed metallic surface with a stop-off material capable of resisting the eroding effect of an etching bath for said metal, at least one of said circuit element outlines providing for a lead-out tab, exposing the base and metal with the circuit elements outlined thereon in stop-off material to the effects of an etching bath until at least part of the exposed area of the metal is completely eroded away, lifting the free end of the lead-out tab from the base layer, providing an aperture in said base layer adjacent the juncture of said lead-out tab and its circuit element and passing the free end of said lead-out tab through said aperture and across the bottom of said sheet beneath other circuit elements.

4. A method of making electrical circuit components which comprises the steps of attaching a sheet of conductive metal to a base layer of uncured resinous insulating material, outlining spaced apart circuit elements on the exposed metallic surface with a stop-off material capable of resisting the eroding effect of an etching bath for said metal, at least one of said circuit elements providing for an integral, elongated lead-out tab, exposing the base and metal with the circuit elements and lead-out tab outlined thereon in stop-off material to the effects of an etching bath until at least part of the exposed area of metal is completely eroded away, lifting the free end of the lead-out tab face from the base layer, providing one aperture in said base layer adjacent the juncture of said lead-out tab and its circuit element and another aperture spaced apart from the first with at least one other circuit element between the apertures, passing the free end of the lead-out tab downwardly through the first aperture, across the bottom of the supporting base layer under and insulated from said other circuit element and out through the second aperture to form a terminal, and then applying another layer of insulating material to the bottom of the base layer and curing to form a composite sheet.

5. A method of making electrical circuit components which comprises the steps of attaching a sheet of conductive metal to a base layer of uncured resinous insulating material, outlining spaced apart circuit elements on the exposed metallic surface with a stop-off material capable of resisting the eroding effect of an etching bath for said metal, at least one of said circuit elements being positioned interiorly from the edges of said base layer and providing for an integral, elongated lead-out tab, exposing the base and metal with the circuit elements and lead-out tab outlined thereon in stop-off material to the effects of an etching bath until at least part of the exposed area of metal is completely eroded away, lifting the free end of the lead-out tab free from the base layer, providing one aperture in said base layer adjacent the juncture of said lead-out tab and its circuit element and another aperture spaced apart from the first adjacent an edge of the base layer with at least one other circuit element spaced from the interior circuit element between the apertures, passing the free end of the lead-out tab downwardly through the first aperture, across the bottom of the supporting base layer under and insulated from said other circuit element and upwardly out through the second aperture to form an external terminal for said interiorly positioned circuit element, and then applying another layer of insulating material to the bottom of the base and curing to form a composite sheet.

6. A method according to claim 5 further characterized in that the base and metal with the circuit outlined thereon in a stop-off material are exposed to said etching bath only for a sufficient length of time so as to produce outwardly sloping concave etched walls bordering the protected unetched areas of the metal.

7. An electrical circuit component comprising a base layer of hardened and cured thermosetting resinous material, thin conductive sheet metal in the form of elongated areas forming interior and exterior circuit elements at the surface of said base layer, a passageway from adjacent an interiorly located circuit element and thru the resinous material to the surface of the resinous material exteriorly said circuit elements, a lead-out formed intergrally with an interior circuit element and composed of an integral part of said sheet metal folded so as to extend thru said passageway to the surface of the resinous material exteriorily of said circuit elements.

References Cited in the file of this patent

UNITED STATES PATENTS

| | | |
|---|---|---|
| 1,718,993 | Wermine | July 2, 1929 |
| 1,938,410 | Van Billiard | Dec. 5, 1933 |
| 1,939,130 | Mills | Dec. 12, 1933 |
| 2,268,619 | Reid | Jan. 6, 1942 |
| 2,441,960 | Eisler | May 25, 1948 |
| 2,493,199 | Khouri | Jan. 3, 1950 |
| 2,683,839 | Beck | July 13, 1954 |
| 2,693,584 | Pifer | Nov. 2, 1954 |
| 2,695,351 | Beck | Nov. 23, 1954 |

FOREIGN PATENTS

| | | |
|---|---|---|
| 953,590 | France | Dec. 8, 1949 |
| 646,314 | Great Britain | Nov. 22, 1950 |